(12) United States Patent
Takahashi et al.

(10) Patent No.: US 12,324,006 B2
(45) Date of Patent: Jun. 3, 2025

(54) TERMINAL, RADIO BASE STATION, AND RADIO COMMUNICATION METHOD

(71) Applicant: NTT DOCOMO, INC., Tokyo (JP)

(72) Inventors: Hideaki Takahashi, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 327 days.

(21) Appl. No.: 17/802,848

(22) PCT Filed: Dec. 1, 2020

(86) PCT No.: PCT/JP2020/044670
§ 371 (c)(1),
(2) Date: Aug. 26, 2022

(87) PCT Pub. No.: WO2021/171721
PCT Pub. Date: Sep. 2, 2021

(65) Prior Publication Data
US 2023/0086223 A1     Mar. 23, 2023

(30) Foreign Application Priority Data
Feb. 27, 2020   (JP) .................................. 2020-031659

(51) Int. Cl.
| | | |
|---|---|---|
| *H04W 72/51* | (2023.01) | |
| *H04W 8/22* | (2009.01) | |
| *H04W 28/18* | (2009.01) | |
| *H04W 72/0453* | (2023.01) | |
| *H04W 76/34* | (2018.01) | |

(52) U.S. Cl.
CPC ............. *H04W 72/51* (2023.01); *H04W 8/22* (2013.01); *H04W 28/18* (2013.01); *H04W 72/0453* (2013.01); *H04W 76/34* (2018.02)

(58) Field of Classification Search
CPC ....... H04W 72/51; H04W 8/22; H04W 28/18; H04W 72/0453; H04W 76/34; H04W 8/24
USPC .......................................... 370/310, 328, 329
See application file for complete search history.

(56) References Cited

U.S. PATENT DOCUMENTS

2018/0019898 A1* 1/2018 Takahashi ........... H04L 25/0204
2020/0329369 A1* 10/2020 Pals ........................ H04L 5/001

FOREIGN PATENT DOCUMENTS

| EP | 3937574 A1 | 1/2022 |
|---|---|---|
| JP | 2019092046 A | 6/2019 |

OTHER PUBLICATIONS

International Search Report issued in PCT/JP2020/044670 on Mar. 2, 2021 (1 page).
Written Opinion of the International Searching Authority issued in PCT/JP2020/044670 on Mar. 2, 2021 (3 pages).

(Continued)

*Primary Examiner* — Obaidul Huq
(74) *Attorney, Agent, or Firm* — Osha Bergman Watanabe & Burton LLP

(57) ABSTRACT

A UE receives capability inquiry information of the UE from the network, and determines a candidate of the combination of frequency bands supported by the UE on the basis of the capability inquiry information. If the combination is a fallback band combination, the UE excludes the combination from a candidate list of combinations.

3 Claims, 4 Drawing Sheets

(56) References Cited

OTHER PUBLICATIONS

3GPP TS 38.306 V15.8.0; "3rd Generation Partnership Project; Technical Specification Group Radio Access Network; NR; User Equipment (UE) radio access capabilities (Release 15)"; Dec. 2019 (60 pages).
3GPP TS 38.331 V15.8.0; "3rd Generation Partnership Project; Technical Specification Group Radio Access Network; NR; Radio Resource Control (RRC) protocol specification (Release 15)"; Dec. 2019 (532 pages).
Office Action issued in Saudi Arabian Patent Application No. 522440313, mailed on Sep. 9, 2023 (9 pages).
Ericsson; "Handling of FR2 fallback band combinations"; 3GPP TSG-RAN WG2 #109-e, Tdoc R2-2001222; Electronic meeting; Feb. 24-Mar. 6, 2020 (3 pages).
Office Action issued in Japanese Application No. 2022-503096; Dated Nov. 21, 2023 (9 pages).
Extended European Search Report issued in European Application No. 20921251.3, mailed Feb. 23, 2024 (15 pages).
Samsung: "Additional UE capability filtering to limit the total number of carriers in NR", 3GPP TSG-RAN WG2 Meeting #109 electronic, R2-2000768; Elbonia, Feb. 24-Mar. 6, 2020 (19 pages).
Huawei, HiSilicon: "CR on fallback BC reporting", 3GPP TSG-RAN WG2 Meeting #109 electronic, R2-2001322; Feb. 24-Mar. 6, 2020 (5 pages).
Office Action issued in Chinese Application No. 202080097145.1; Dated Oct. 8, 2024 (18 pages).

\* cited by examiner

TERMINAL, RADIO BASE STATION, AND RADIO COMMUNICATION METHOD

TECHNICAL FIELD

The present invention relates to a terminal for executing radio communication, and more particularly to a terminal, a radio base station, and a radio communication method capable of determining a combination of frequency bands that can be supported.

BACKGROUND ART

3rd Generation Partnership Project (3GPP) specifies Long Term Evolution (LTE), and with the aim of further speeding, specifies LTE-Advanced (hereinafter, the LTE includes the LTE-Advanced), further, a succeeding system of the LTE called 5G New Radio (NR) or Next Generation (NG) and the like is being specified.

The 3GPP Release 15 specifies a method for notifying a band combination of frequency bands (hereinafter, the term is appropriately omitted as "band".) in which a terminal (User Equipment, UE) can transmit and receive a radio signal (specifically, a carrier) (Non-Patent Literature 1).

In addition, in 3GPP Release 15, Fallback band combination is specified as a terminal capability (Non-Patent Literature 2).

Fallback band combination is a band combination resulting from another band combination by releasing at least one secondary cell or the uplink (UL) configuration of secondary cell or secondary cell group (SCG). A combination of discontinuous bands in a band may not be considered a combination of fallback bands of continuous band combinations in a band.

CITATION LIST

Non-Patent Literature

Non-Patent Literature 1

3GPP TS 38.331 V 15.8.0, 3rd Generation Partnership Project; Technical Specification Group Radio Access Network; NR; Radio Resource Control (RRC) protocol specification (Release 15), 3GPP, December 2019

Non-Patent Literature 2

3GPP TS 38.306 V 15.8.0, 3rd Generation Partnership Project; Technical Specification Group Radio Access Network; NR; User Equipment (UE) radio access capabilities (Release 15), 3GPP, December 2019

SUMMARY OF INVENTION

According to the current 3GPP Release 15 specifications, if it is considered to be a fallback band combination that has the same capabilities as other band combinations, a terminal will exclude the fallback band combination from the list of candidate band combinations.

In this case, since a part of the band combination of NR standalone (SA) which is a band combination for fallback of other NE-DC (NR-E-UTRA Dual Connectivity) is deleted, the band combination of NR SA in the NR container is not perfect.

In order to obtain all the band combinations of SA supported by the terminal, the network needs to combine the band combinations of the SA of the NR container and the band combinations of the SA of the MR-DC (Multi-RAT Dual Connectivity) container, which complicates implementation.

Accordingly, the following disclosure has been made in view of such a situation, and it is an object of the present invention to provide a terminal, a radio base station, and a radio communication method that can avoid the complexity of network implementation related to band combination processing.

One aspect of the present disclosure is a terminal (UE 200) including a reception unit (capability information processing unit 250) that receives capability inquiry information of the terminal, and a control unit (control unit 240) that determines a candidate of a combination of frequency bands supported by the terminal on the basis of the capability inquiry information. The control unit excludes the combination from a candidate list of the combination if the combination is a fallback band combination.

One aspect of the present disclosure is a radio base station including a transmission unit that transmits capability inquiry information of a terminal to the terminal, and a reception unit that receives capability information in which a combination is excluded from a candidate list of the combination if the combination of frequency bands supported by the terminal is a fallback band combination.

One aspect of the present disclosure is a radio communication method comprising the steps of receiving capability query information of a terminal, and determining a candidate for a combination of frequency bands supported by the terminal on the basis of the capability inquiry information. In the determining step, the combination is excluded from a candidate list of the combination if the combination is a fallback band combination.

MODES FOR CARRYING OUT THE INVENTION

Figure 1:
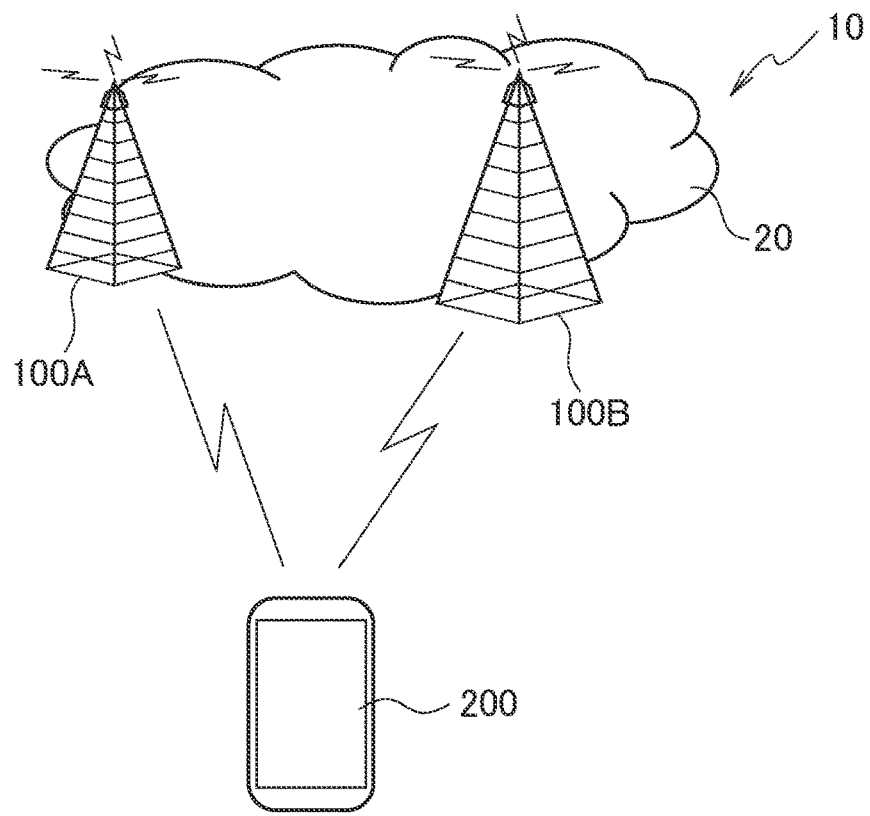
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

FIG. 1 is an overall schematic configuration diagram of the radio communication system 10 according to this embodiment. The radio communication system 10 is a radio communication system according to Long Term Evolution (LTE) and 5G New Radio (NR) and includes a radio access network 20 (hereinafter RAN 20), and a user terminal 200 (User Equipment 200, hereinafter UE 200).

The RAN 20 is a radio access network that including an Evolved Universal Terrestrial Radio Access Network (E-UTRAN) and Next Generation-Radio Access Network (NG-RAN).

The RAN 20 includes radio base stations 100 A, 100 B (eNB 100 A, gNB 100 B). The specific configuration of radio communication system 10 including the number of eNBs, gNBs and UEs is not limited to the example shown in FIG. 1.

The RAN 20 actually includes a plurality of RAN Nodes, specifically, an LTE eNB and an NR gNB, and is connected to a core network (EPC/5GC, not shown) according to LTE/5G. The RAN 20 and the core network may be expressed simply as a network.

The eNB 100 A and the gNB 100 B perform radio communication with the UE 200 according to LTE or 5G. By controlling radio signals transmitted from a plurality of antenna elements, the eNB 100 A, the gNB 100 B, and the UE 200 can support MIMO for generating beams with higher directivity, carrier aggregation (CA) for bundling a plurality of component carriers (CCs), and dual connectivity (DC) for simultaneously communicating between the UE and each of a plurality of NG-RAN nodes.

In particular, the radio communication system 10 supports NR-E-UTRA Dual Connectivity (NE-DC), which is the DC between LTE and NR. It should be noted that the radio communication system 10 may support other DCs, specifically NR-NR Dual Connectivity (NR-DC) or E-UTRA-NR Dual Connectivity (EN-DC).

The UE 200 can combine the numbers (band numbers) of the frequency bands supported by its own terminal to generate one band combination, and can notify the network of the generated band combination as UE Capability Information.

(2) Function Block Configuration of Radio Communication System

Figure 2:
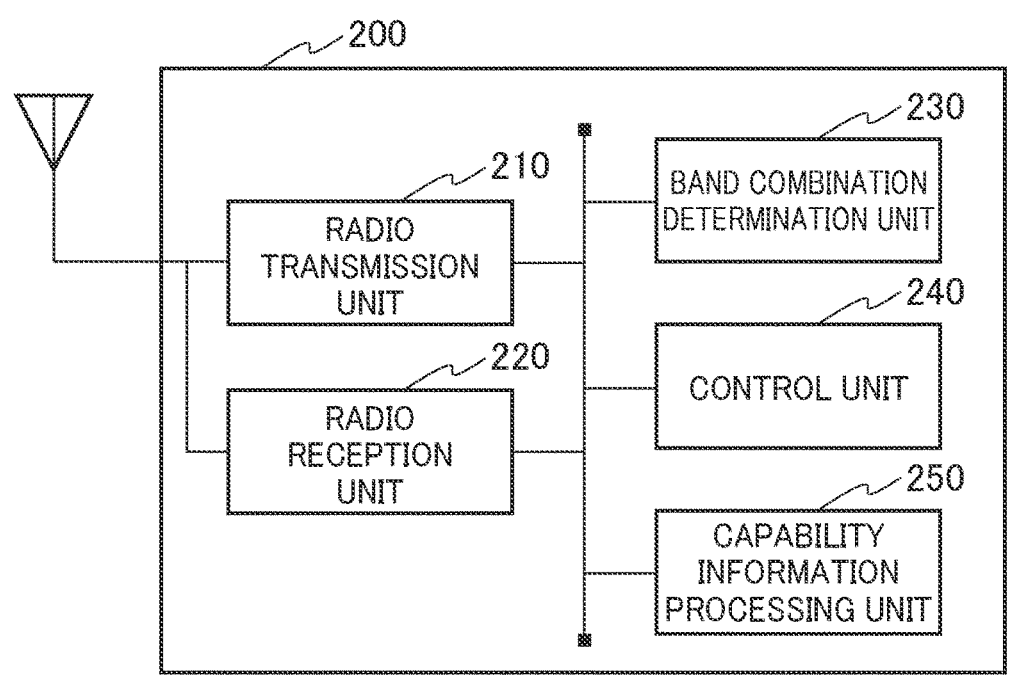
FIG. 2 is a functional block diagram of a UE 200.

Next, the functional block configuration of the radio communication system 10 will be described. Specifically, the functional block configuration of the UE 200 will be described. FIG. 2 is a functional block diagram of the UE 200.

As shown in FIG. 2, the UE 200 includes a radio transmission unit 210, a radio reception unit 220, a band combination determination unit 230, a control unit 240, and a capability information processing unit 250.

The radio transmission unit 210 transmits an uplink signal (UL signal) in accordance with NR. The radio reception unit 220 receives a downlink signal (DL signal) in accordance with NR.

Specifically, the radio transmission unit 210 and the radio reception unit 220 perform radio communication via a control channel or data channel.

The control channels include PDCCH (Physical Downlink Control Channel), PUCCH (Physical Uplink Control Channel), PRACH (Physical Random Access Channel), PBCH (Physical Broadcast Channel), and the like.

The data channels include PDSCH (Physical Downlink Shared Channel) and PUSCH (Physical Uplink Shared Channel).

The reference signals include a Demodulation reference signal (DMRS), a Sounding Reference Signal (SRS), a Phase Tracking Reference Signal (PTRS), and a Channel State Information-Reference Signal (CSI-RS). The signals may also include channel and reference signals. The data may refer to data transmitted via a data channel.

The band combination determination unit 230 determines a combination of frequency bands supported by the UE 200. Specifically, the band combination determination unit 230 determines a band combination of frequency bands with which the UE 200 can transmit and receive radio signals. The radio signal may be read as a carrier, a frequency carrier, or a component carrier (CC).

The frequency band may be expressed simply as a band, or may be expressed as a frequency band or the like.

The band combination determination unit 230 generates one band combination by combining the numbers (band numbers) of supported frequency bands. The band combination determination unit 230 can generate a plurality of such band combinations.

The frequency band combination may include a fallback band combination. The fallback band combination may be interpreted as a band combination resulting from another band combination by releasing at least one secondary cell (SCell) or the uplink (UL) configuration of secondary cell or secondary cell group (SCG).

The control unit 240 controls each functional block constituting the UE 200. In particular, in this embodiment, the control unit 240 causes the band combination determination unit 230 to determine the combination of frequency bands supported by the UE 200 based on the information of the frequency bands.

More specifically, the control unit 240 can determine a candidate band combination of frequency bands supported by the UE 200 based on capability enquiry of the UE 200 (UE Capability Enquiry) received by the capability information processing unit 250.

In determining such a candidate band combination, the control unit 240 may, if the frequency band combination is not a Fallback band combination, exclude (remove) the frequency band combination from the candidate list of combinations, specifically, the list of candidate band combinations.

More specifically, the control unit 240 may exclude a frequency band combination from the list of candidate band combinations if the determined frequency band combination is considered a fallback band combination having the same capabilities as other band combinations and the frequency band combination is not a fallback band combination.

More specifically, in Section 3GPP TS 38.331 5.6.1.4, it may be expressed as follows:

The UE shall: . . .

1> for each band combination included in the list of "candidate band combinations":

2> if it is regarded as a fallback band combination with the same capabilities of another band combination included in the list of "candidate band combinations", and 2> if it is not the fallback band combination resulted from another band combination by releasing SCG:

The capability information processing unit 250 executes processing of information related to the capability of the UE 200 (UE Capability Information). More specifically, the capability information processing unit 250 can receive the UE Capability Enquiry from the network, which is information for inquiring the capability of the UE 200. In this embodiment, the capability information processing unit 250 constitutes a reception unit.

In addition, the capability information processing unit 250 can transmit information (UE Capability Information) indicating the capability of the UE 200 for radio communication and the like to the network.

The capability information processing unit 250 can transmit/receive the UE Capability Enquiry and the UE Capability Information by using the signaling of the upper layer (for example, the radio resource control layer (RRC)).

In this embodiment, the capability information processing unit 250 can transmit capability information including band combination. The capability information of the band combination may include the fallback band combination as described above.

(3) Operation of Radio Communication System

Next, the operation of the radio communication system 10 will be described. Specifically, an operation related to the reporting of the band combination by the UE 200 will be described.

(3.1) Communication Sequence

Figure 3:
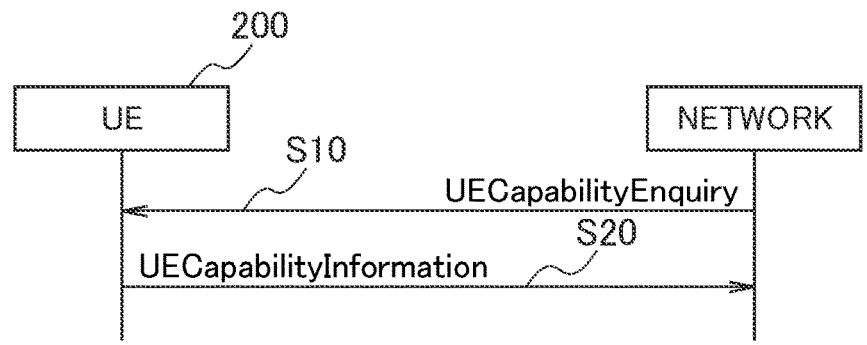
FIG. 3 shows an example of notification sequence of a UE Capability Information.

FIG. 3 shows an example of notification sequence of UE Capability Information. As shown in FIG. 3, the UE 200, in response to the inquiry (UE Capability Enquiry) from the network (S 10), replies the UE Capability Information (S 20).

The UE Capability Information may include information on frequency band combinations that the UE 200 is capable of supporting, specifically, band combinations including Fallback band combination.

Figure 5:
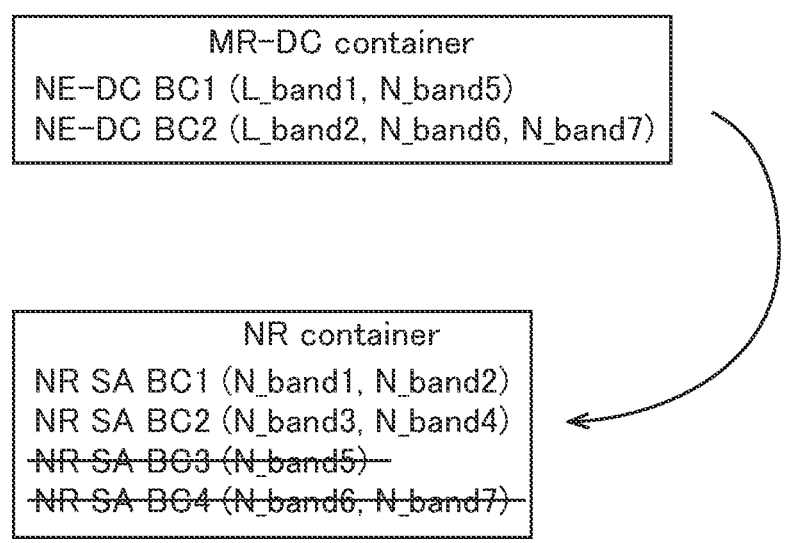
FIG. 5 shows an example of frequency band combinations reported by the UE 200.

FIG. 5 shows an example of frequency band combinations reported by UE 200. Specifically, FIG. 5 shows a combination (BC) of frequency bands included in the MR-DC (Multi-RAT Dual Connectivity) container, specifically, a combination of BC for NE-DC (NR-E-UTRA Dual Connectivity) and BC included in the NR container (NR standalone (SA) configuration).

(3.2) UE Capability Information Reporting Behavior

Figure 4:
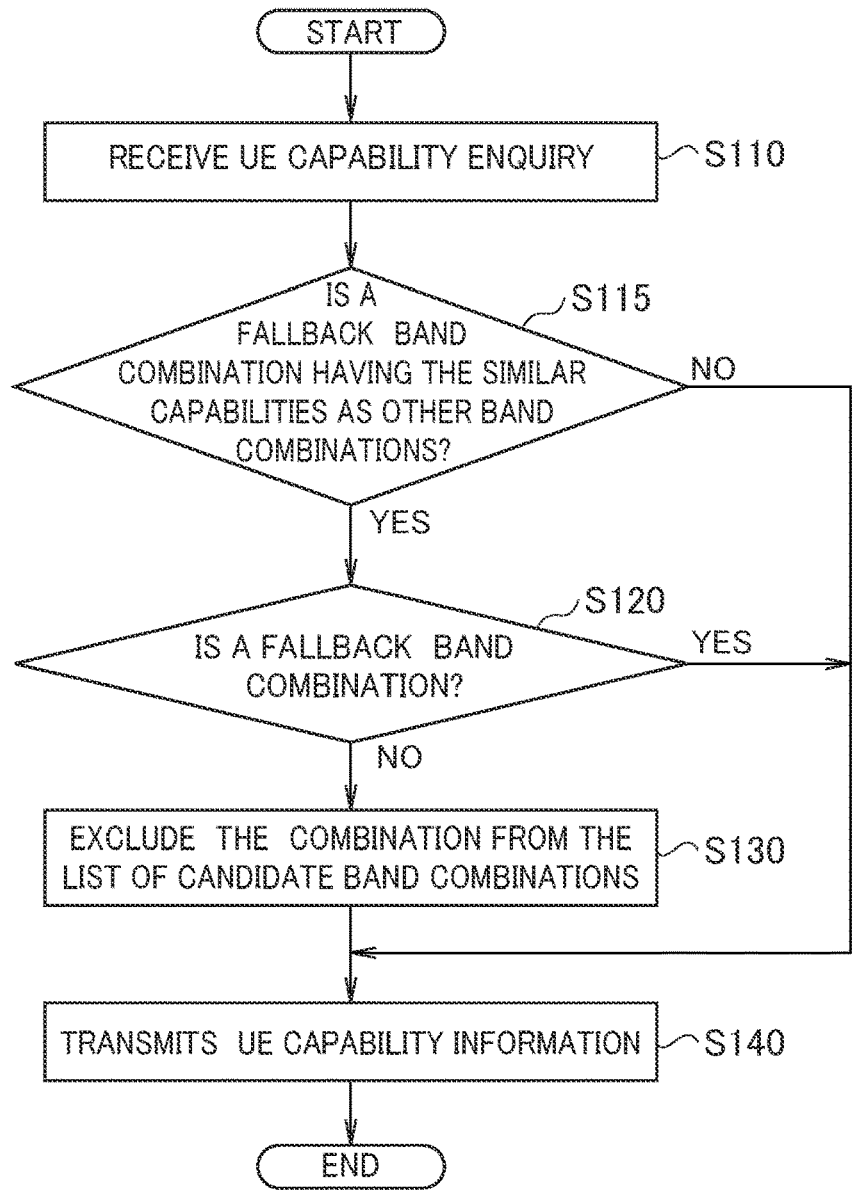
FIG. 4 is a diagram illustrating the operational flow for reporting UE Capability Information for UE 200.

FIG. 4 shows an operation flow for reporting the UE Capability Information of the UE 200. As shown in FIG. 4, the UE 200 receives the UE Capability Enquiry (S 110).

The UE 200 determines a supportable frequency band combination and determines whether the combination is considered a fallback band combination having the similar capabilities as other band combinations (step 115).

Here, the similar capabilities may be interpreted as the same capabilities or as capabilities that are not necessarily the same but can be treated as substantially the same.

Capabilities are not specifically limited to those that affect the capabilities of the radio communications, such as the bandwidth of the frequency band, the related frequency direction (and/or time direction) resource blocks, etc.

The other band combination may differ from the other band combination in at least a portion of the bands constituting the determined combination. In addition, other band combinations (another band combination) may be included in the list of candidate band combinations.

If the combination is considered to be a fallback band combination having the similar capability as other band combinations, the UE 200 determines whether the combination is a Fallback band combination (S 120).

Specifically, UE 200 may determine whether the combination is a band combination resulting from another band combination by releasing at least one secondary cell (SCell) or the uplink (UL) configuration of secondary cell or secondary cell group (SCG).

It should be noted that the release is not necessarily limited to the release of the UL configuration of the SCell, but may be, for example, the release of some configuration related to the SCG.

The UE 200 excludes the combination from the list of candidate band combinations if the combination is not the Fallback band combination (S 130).

Specifically, the corresponding combinations are eliminated from the list of candidate band combinations that may include a plurality of frequency band combinations.

The UE 200 transmits the UE Capability Information including the frequency band combination to the network on the basis of the contents of the list of candidate band combinations determined by the processing up to S 130 (S 140).

The network, specifically, the RAN 20 executes the scheduling of the UE 200 or the like based on the UE Capability Information received from the UE 200.

(4) Operational Effects

According to the embodiment described above, the following effects are obtained. Specifically, if the determined frequency band combination is not a Fallback band combination, the UE 200 may exclude the combination from the list of candidate band combinations.

Specifically, the UE 200 may exclude the frequency band combination from the list of candidate band combinations if the determined frequency band combination is considered a fallback band combination having the similar capabilities as other band combinations and the frequency band combination is not a fallback band combination.

Thus, the UE 200 does not simply exclude the fallback band combination from the list of candidate band combinations, even if the determined frequency band combination is considered to be a fallback band combination having the same capabilities as other band combinations, and the frequency band combination is excluded from the list of candidate band combinations if it is clearly not a fallback band combination.

Thus, as in the example shown in FIG. 5, it is possible to avoid, for example, that some of the NR standalone (SA) band combinations are deleted and the NR SA band combinations in the NR container become incomplete. Thus, the network need not combine the band combinations of the SA of the NR container with the band combinations of the SA of the MR-DC (Multi-RAT Dual Connectivity) container to obtain all the band combinations of the SA supported by the UE 200.

That is, according to the UE 200, it is possible to avoid an increase in the complexity of the network implementation related to the processing of the band combination.

(5) Other Embodiments

Although the contents of the present invention have been described by way of the embodiments, it is obvious to those skilled in the art that the present invention is not limited to what is written here and that various modifications and improvements thereof are possible.

For example, although the NE-DC has been described as an example in the above-described embodiment, the above-described operation may also be applied to another DC (NR-DC, EN-DC) if it is also applied to the DC.

A block diagram (FIG. 2) used in the description of the above-described embodiment shows a block for each function unit. Those functional blocks (structural components)

can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions the transmission is called a transmission unit (transmitting unit) or a transmitter. As described above, there is no particular limitation on the method of implementation.

Figure 6:
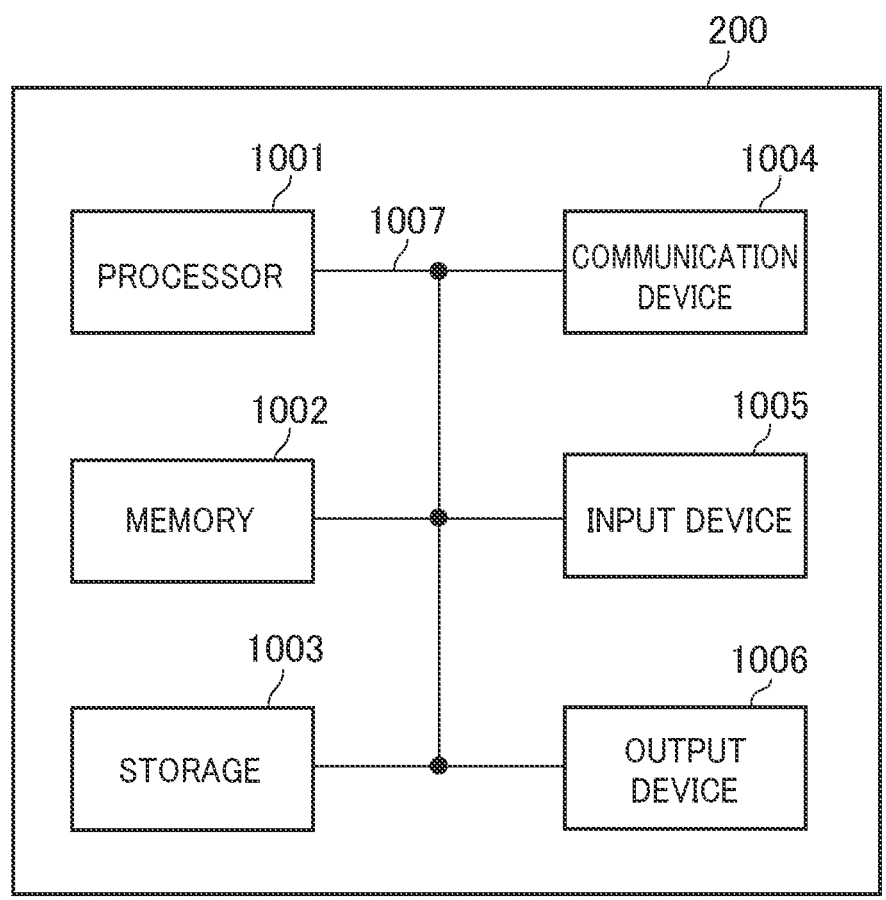
FIG. 6 shows an example of the hardware configuration of the UE 200.

Furthermore, the UE 200 described above may function as a computer that performs processing of the radio communication method of the present disclosure. FIG. 6 is a diagram showing an example of a hardware configuration of the UE 200. As shown in FIG. 6, the UE 200 may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the UE 200 (see FIG. 2) is implemented by any hardware element or combination of hardware elements of the computer device.

Functions in the UE 200 are realized by reading predetermined software (programs) onto hardware such as the processor 1001 and the memory 1002, so that the processor 1001 performs arithmetic operations to control communication by communication device 1004, or to control at least one of reading and writing of data in the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (Drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal). For example, each aspect/embodiment of the present disclosure may be applied to a configuration in which communication between a base station and a mobile station is replaced with communication between a plurality of mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, the mobile station in the present disclosure may be read as a base station. In this case, the base station may have the function of the mobile station. A radio frame may be composed of one or more frames in the time domain. Each frame or frames in the time domain may be referred to as a subframe. A subframe may be further configured by one or more slots in the time domain. The subframe may be a fixed time length (For example, 1 ms) independent of the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in time units greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain.

The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean, "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first," "second," and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or "decision" may include regarding some action as "judgment" or "decision". Moreover, "judgment (decision)" may be read as "assuming", "expecting", "considering", and the like.

In the present disclosure, the term "A and B are different" may mean "A and B are different from each other". It should be noted that the term may mean "A and B are each different from C."

Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 RAN
100A eNB
100B gNB
200 UE
210 Radio transmission unit
220 Radio reception unit
230 Band combination determination unit
240 Control unit
250 Capability information processing unit
1001 Processor
1002 Memory
1003 Storage
1004 Communication device
1005 Input device
1006 Output device
1007 Bus

The invention claimed is:

1. A terminal comprising:
a receiver that receives capability inquiry information of the terminal; and
a processor that determines a candidate of a combination of frequency bands supported by the terminal on the basis of the capability inquiry information; and
a transmitter that transmits capability information including a candidate list that excludes the combination if the combination is a fallback band combination and is not a fallback band combination resulting from other band combinations due to release of a secondary cell group.

2. A radio base station comprising:
a transmitter that transmits capability inquiry information of a terminal to the terminal; and
a receiver that receives capability information in which a combination is excluded from a candidate list of the combination if the combination of frequency bands supported by the terminal is a fallback band combination and is not a fallback band combination resulting from other band combinations due to release of a secondary cell group.

3. A radio communication method comprising the steps of:
receiving capability inquiry information of a terminal; and determining a candidate for a combination of frequency bands supported by the terminal on the basis of the capability inquiry information, wherein in the determining step, the combination is excluded from a candidate list of the combination if the combination is a fallback band combination and is not a fallback band combination resulting from other band combinations due to release of a secondary cell group.

\* \* \* \* \*